United States Patent
Zhao et al.

(10) Patent No.: US 11,477,326 B2
(45) Date of Patent: Oct. 18, 2022

(54) AUDIO PROCESSING METHOD, DEVICE, AND APPARATUS FOR MULTI-PARTY CALL

(71) Applicant: Beijing Lenovo Software Ltd., Beijing (CN)

(72) Inventors: Zeqing Zhao, Beijing (CN); Peilai Xu, Beijing (CN); Chuanliang Zhang, Beijing (CN); Guangmin Xia, Beijing (CN); Yang Liu, Beijing (CN)

(73) Assignee: BEIJING LENOVO SOFTWARE LTD., Beijing (CN)

( * ) Notice: Subject to any disclaimer, the term of this patent is extended or adjusted under 35 U.S.C. 154(b) by 13 days.

(21) Appl. No.: 17/207,535

(22) Filed: Mar. 19, 2021

(65) Prior Publication Data

US 2021/0400143 A1 Dec. 23, 2021

(30) Foreign Application Priority Data

Jun. 19, 2020 (CN) .......................... 202010565178.6

(51) Int. Cl.
| | |
|---|---|
| *H04M 3/56* | (2006.01) |
| *H04L 65/403* | (2022.01) |
| *H04L 65/60* | (2022.01) |
| *H04L 65/80* | (2022.01) |
| *H04M 3/42* | (2006.01) |

(52) U.S. Cl.
CPC .......... *H04M 3/568* (2013.01); *H04L 65/403* (2013.01); *H04L 65/60* (2013.01); *H04L 65/80* (2013.01); *H04M 3/42348* (2013.01)

(58) Field of Classification Search
CPC . H04M 3/568; H04M 3/42348; H04L 65/403; H04L 65/60; H04L 65/80; H04L 65/1069; H04L 65/1083; H04L 65/1066
See application file for complete search history.

(56) References Cited

U.S. PATENT DOCUMENTS

| | | | |
|---|---|---|---|
| 2013/0017811 A1* | 1/2013 | Lundsgaard | ........ H04L 65/1026 455/416 |
| 2015/0195411 A1* | 7/2015 | Krack | ................... H04M 3/569 379/202.01 |
| 2015/0372654 A1* | 12/2015 | Hetherington | .......... G10L 21/02 381/107 |

FOREIGN PATENT DOCUMENTS

CN 108551534 A 9/2018

* cited by examiner

*Primary Examiner* — Brenda H Pham
(74) *Attorney, Agent, or Firm* — Anova Law Group, PLLC

(57) ABSTRACT

An audio processing method for a multi-party call. The method includes obtaining a preset attribute value of each of at least one audio signal currently obtained by a first electronic device participating in a multi-party call, determining a target attribute value configured for the audio signal collected by the first electronic device, and detecting a first audio signal from the at least one audio signal currently obtained by the first electronic device and prohibiting the first electronic device from outputting the first audio signal. The preset attribute value is configured for the audio signal collected by each of a plurality of electronic devices participating in the multi-party call according to an attribute configuration rule determined according to a positional relationship between the plurality of electronic devices. A comparison result between a corresponding preset attribute value of the first audio signal and the target attribute value satisfies a first condition.

16 Claims, 7 Drawing Sheets

AUDIO PROCESSING METHOD, DEVICE, AND APPARATUS FOR MULTI-PARTY CALL

CROSS-REFERENCE TO RELATED APPLICATION

This application claims priority of Chinese Patent Application No. 202010565178.6, filed on Jun. 19, 2020, the entire content of which is incorporated herein by reference.

TECHNICAL FIELD

The present disclosure relates to the use scenario of multi-party calls and, in particular, to an audio processing method, device, and apparatus for multi-party call.

BACKGROUND

Multi-party call refers to a multi-party online voice call realized through various methods, including multi-party and remote real-time online communications. Multi-party call application scenarios include meetings and games.

However, two participants participating in a multi-party call may be located at the same place. For example, participant A and participant B are in a same room, and participant C is at a different place. In this example, during a multi-party call, each participant uses his electronic device to collect audio and play audio signals collected and received. The played audio signals are often delayed relative to voices of the participants at the scene, which cause confusion for participants A and B in the same room when the other participant speaks, thereby affecting efficiency of the multi-party call.

SUMMARY

One aspect of the present disclosure provides an audio processing method for a multi-party call. The method includes obtaining a preset attribute value of each of at least one audio signal currently obtained by a first electronic device participating in a multi-party call, determining a target attribute value configured for the audio signal collected by the first electronic device, and detecting a first audio signal from the at least one audio signal currently obtained by the first electronic device and prohibiting the first electronic device from outputting the first audio signal. The preset attribute value is configured to accommodate the audio signals collected by each of a plurality of electronic devices participating in the multi-party call according to an attribute configuration rule determined according to a positional relationship between the plurality of electronic devices. A comparison result between a corresponding preset attribute value of the first audio signal and the target attribute value satisfies a first condition.

Another aspect of the present disclosure provides an audio processing device for a multi-party call, including a preset attribute value obtaining module, a target attribute value determining module, and an audio signal output prohibiting module. The preset attribute value obtaining module is configured to obtain a preset attribute value of each of at least one audio signal currently obtained by a first electronic device participating in a multi-party call. The target attribute value determining module is configured to determine a target attribute value configured for the audio signal collected by the first electronic device. The audio signal output prohibiting module is configured to detect a first audio signal from the at least one audio signal and prohibit the first electronic device from outputting the first audio signal. The preset attribute value is configured to accommodate the audio signals collected by each of a plurality of electronic devices participating in the multi-party call according to an attribute configuration rule determined according to a positional relationship between the plurality of electronic devices. A comparison result between a corresponding preset attribute value of the first audio signal and the target attribute value satisfies a condition.

Another aspect of the present disclosure provides an audio processing apparatus for a multi-party call, including a memory storing a computer program, and a processor configured to execute the computer program to obtain a preset attribute value of each of at least one audio signal currently obtained by a first electronic device participating in a multi-party call, determine a target attribute value configured for the audio signal collected by the first electronic device, and detect a first audio signal from the at least one audio signal currently obtained by the first electronic and prohibit the first electronic device from outputting the first audio signal. The preset attribute value is configured to accommodate audio signals collected by each of a plurality of electronic devices participating in the multi-party call according to an attribute configuration rule determined according to a positional relationship between the plurality of electronic devices. A comparison result between a corresponding preset attribute value of the first audio signal and the target attribute value satisfies a first condition.

DETAILED DESCRIPTION OF THE EMBODIMENTS

Figure 1:
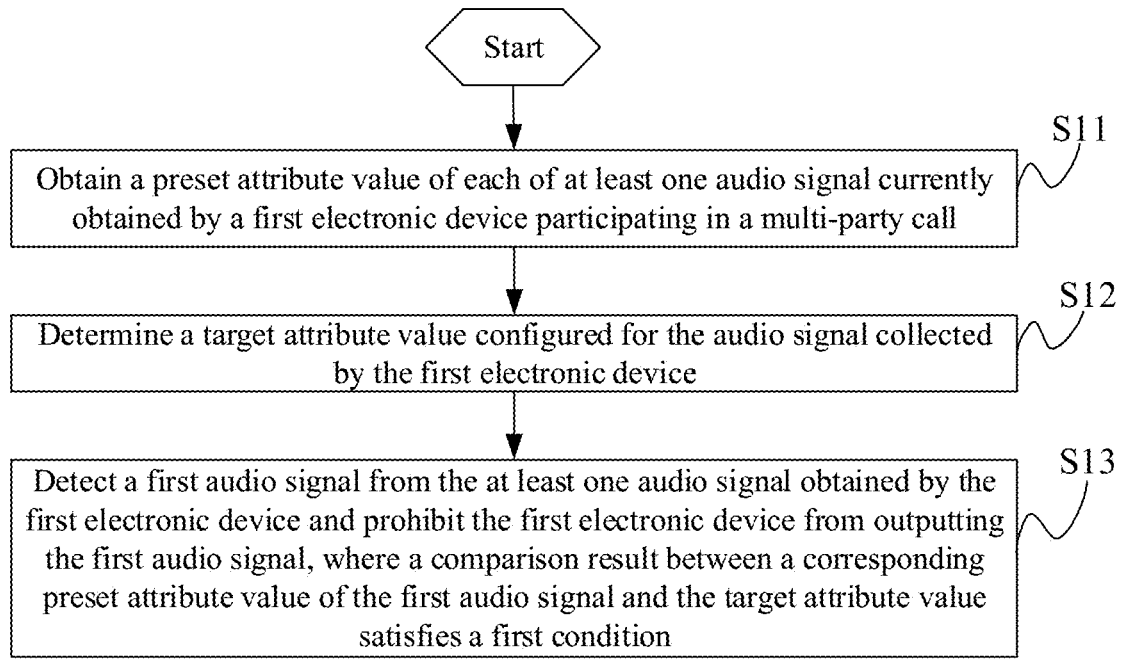
FIG. 1 is a schematic flow chart of an audio processing method for multi-party call according to one embodiment consistent with the disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

For ease of description, only the parts related to the relevant disclosure are shown in the drawings. The embodiments of the present disclosure and features in the embodiments can be combined with each other when there is no conflict.

The terms "system," "device," "unit," and/or "module" used in this disclosure is a method for distinguishing different components, elements, members, parts, or assemblies of different levels. However, if other words can achieve the same purpose, they can be replaced by other expressions.

Unless otherwise defined, the terms "a," "an," and/or "the" do not specifically refer to the singular but may also include the plural. The terms "include" only suggest that the processes and elements that have been clearly identified are included, and these processes and elements do not constitute an exclusive list, and the method or device may also include other processes or elements. The element defined by the phrase "including a . . . " does not exclude the existence of other identical elements in the process, method, commodity, or equipment that includes the element.

Unless otherwise defined, "/" refers to or, for example, AB refers to A or B. "and/or" is only a description of association relationship of related objects indicating that there can be three kinds of relationships. For example, A and/or B, which can indicate A alone exists, A and B exist at the same time, and B exists alone. In addition, the term "a plurality of" refers two or more than two. The terms "first" and "second" are only used for descriptive purposes and cannot be understood as indicating or implying relative importance or implicitly indicating the number of indicated technical features. Thus, the features defined with "first" and "second" may explicitly or implicitly include one or more of these features.

In addition, flow charts are used to illustrate the operations performed by the system according to the embodiments of the disclosure. The preceding or following operations are not necessarily performed exactly in order. Instead, the processes can be processed in reverse order or at the same time. Also, other operations can be added to these processes, or one or more operations can be removed from these processes.

FIG. 1 is a schematic flow chart of an audio processing method for multi-party call according to one embodiment consistent with the disclosure. The method may be applicable to an audio processing device for a multi-party call, and the audio processing device may be a communication server, or a computer device, such as an electronic device that participates in a multi-party call, which is not limited here.

As shown in FIG. 1, at S11, a preset attribute value of each of at least one audio signal currently obtained by a first electronic device participating in a multi-party call is obtained.

In an application scenario for multi-party call, such as a conference, a game, or an online teaching, any one electronic device participating in a multi-party call is recorded as a first electronic device. Under a normal circumstance, the first electronic device can obtain one or more audio signals uploaded by any other electronic devices (that is, another one or more electronic devices participating in the multi-party call in addition to the first electronic device) participating in the multi-party call and play the one or more audio signals obtained.

Figure 2A:
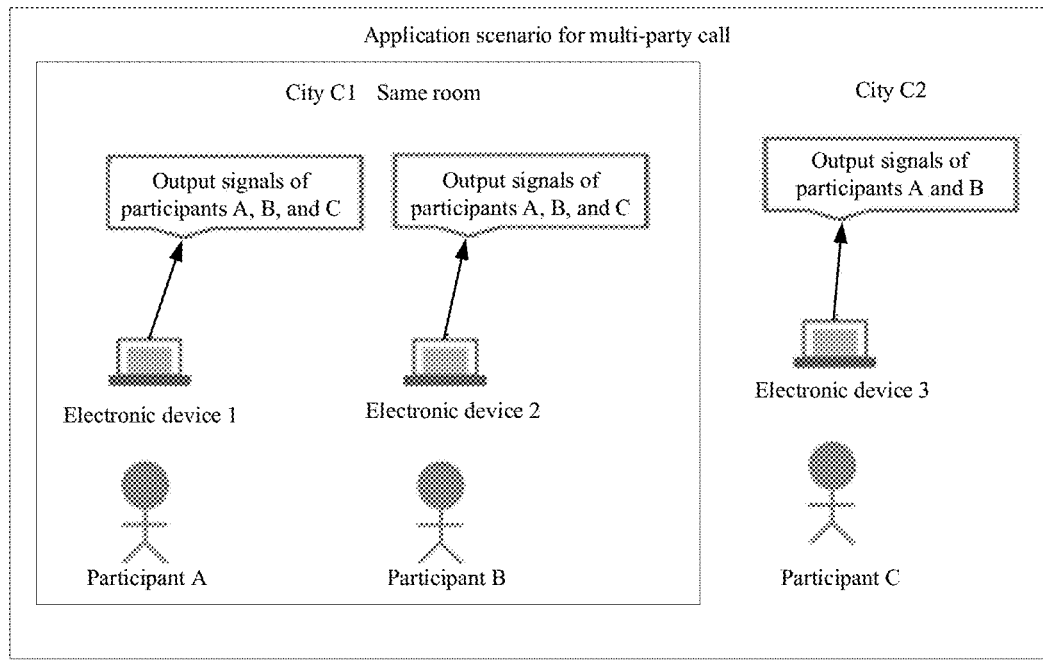
FIG. 2A is a schematic diagram of an existing application scenario of an audio processing method for multi-party call.

However, in an application scenario shown in FIG. 2A, participant A and participant B use their own electronic devices to participate in a multi-party call in a same room in city C1. Participant C participates in the multi-party call in a city C2. According to a traditional audio processing method for a multi-party call, taking a situation that participant A speaks as an example, an electronic device 1 and an electronic device 2 used by participant A and participant B may collect an audio signal of participant A. The electronic device 1 then sends the collected audio signal of participant A to the electronic device 2 of participant B and an electronic device 3 of participant C for playback. Although participant B hears what participant A speaks, the electronic device 2 may still play the audio signal of participant A again, which causes multiple voices at the same time. Such scenarios can be very chaotic and interfere with the user experience of participant B.

The electronic device 2 of participant B may also send the collected audio signal of participant A to the electronic device 1 of participant A and the electronic device 3 of participant C for playback, thereby causing the electronic device 1 to play the audio signal spoken by a user thereof, that is, participant A. Obviously, this is unnecessary and easily interferes with participant A.

For the application scenario shown in FIG. 2A, the process of the electronic device 1 and the electronic device 2 collecting and playing the audio signals thereof and each other is unnecessary, which not only interferes with participants, but also increases audio processing burden of the electronic device.

Figure 2B:
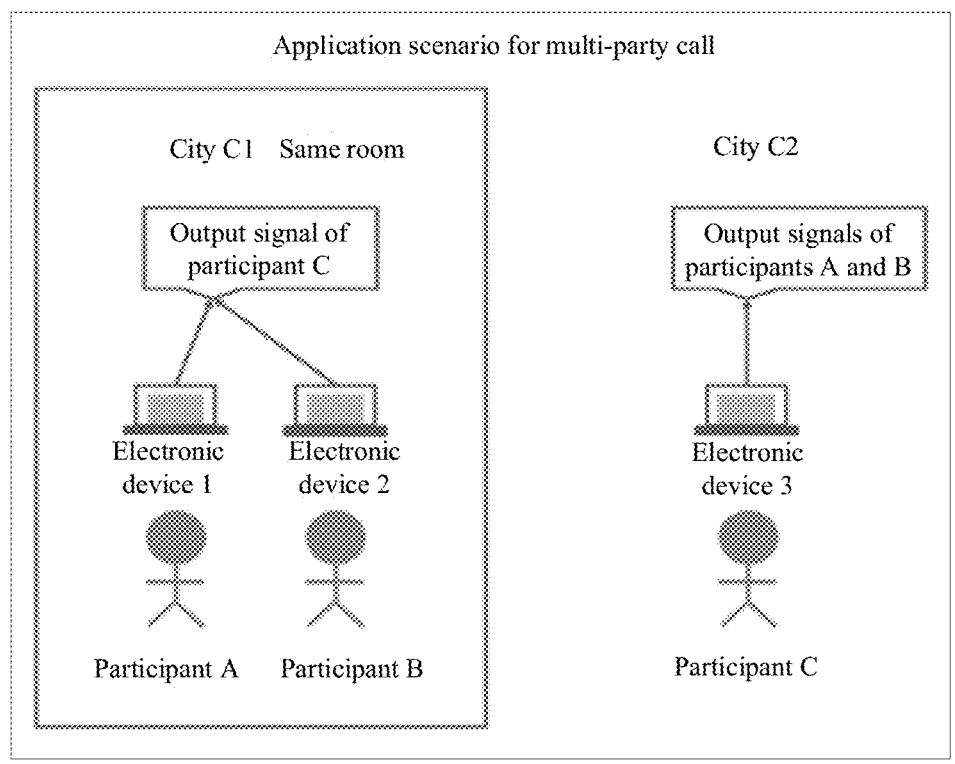
FIG. 2B is a schematic diagram of an application scenario of an audio processing method for multi-party calls consistent with the disclosure.

In view of the above problem, the electronic devices of participant A and participant B in the same room are expected not to play the audio signal of each other, but only play the audio signal of participant C, such as an application scenario shown in FIG. 2B. Therefore, determining an attribute configuration rule based on a positional relationship between a plurality of electronic devices participating in the multi-party call, and configuring the preset attribute value for the audio signal collected by each of the plurality of electronic devices based on the attribute configuration rule are proposed in the present disclosure. Therefore, one of the plurality of electronic devices can determine the positional relationship with a source electronic device of each received audio signal according to the preset attribute value, and then prohibit outputting the audio signal from the electronic device in a same physical space (for example, within a preset spatial range).

The different preset attribute values can be used to identify the positional relationship between the source electronic devices of the corresponding audio signal, which needs to be able to indicate the source electronic device of the corresponding audio signal. Specifically, the preset attribute value may indicate geographic coordinates of the electronic device, an identifier of the electronic device, a unique tag, such as numbers, letters, etc. The preset attribute value and generation method of the attribute configuration rule used to configure the preset attribute value and the content thereof of present disclosure are not limited here, which can be determined according to actual application requirements.

The at least one audio signal currently obtained by the first electronic device may include the at least one audio signal collected by the first electronic device itself, and/or a received audio signal collected and sent by a second electronic device. Because the first electronic device may store the audio signal in a data buffer space and determine whether to play the audio signal properly after the first electronic device obtains the audio signal, the at least one audio signal currently obtained can be obtained from the data buffer space of the first electronic device, and then obtain the preset attribute value corresponding to each of the audio signals following the above-described method.

As shown in FIG. 1, at S12, a target attribute value configured for the audio signal collected by the first electronic device is determined.

In combination with the above description of the preset attribute value, the corresponding preset attribute value of the audio signal collected by the first electronic device itself may be directly queried from a pre-configured correspondence relationship between the audio signal collected by each of the electronic devices participating in a multi-party call and the preset attribute value, and determined as the target attribute value. For the content of the target attribute value, reference can be made to the description of the preset attribute value above.

Content category of the preset attribute values corresponding to the audio signals collected by different electronic devices are consistent with each other, but the specific category of the content category is not limited here.

As shown in FIG. 1, at S13, a first audio signal whose comparison result between a corresponding preset attribute value of the first audio signal and the target attribute value satisfies a first condition is detected from the at least one audio signal obtained by the first electronic device, and the first electronic device is prohibited from outputting the first audio signal.

In combination with the above description of the preset attribute value and the attribute configuration rule, a difference between different preset attribute values can indicate the positional relationship between the corresponding electronic devices. Therefore, to avoid the first electronic device playing the audio signal sent by the second electronic device in the same physical space (the definition of the same physical space is not limited here), after the first electronic device receives the audio signal sent by another electronic device participating in a multi-party call, because the audio signal carries the corresponding preset attribute value, the preset attribute value of the received audio signal can be compared with the target attribute value corresponding to the first electronic device to obtain the comparison result. At least one another electronic device in the same space as the first electronic device can be detected according to the comparison result, thereby causing the audio signal sent by the at least one another electronic device to be recorded as the first audio signal. At this time, the first electronic device is prohibited from outputting the first audio signal, that is, the first electronic device is prohibited from outputting the audio signal sent by another electronic device in the same physical space.

The first condition may include that when the difference between the preset attribute value and the target attribute value corresponding to the first electronic device is less than a first attribute threshold, it can be determined that the electronic device corresponding to the preset attribute value and the first electronic device are in the same physical space. The content of the first attribute threshold is not limited here. The content of the first condition can be adjusted adaptively for the preset attribute value of different content, such as whether the tag or device identifiers are the same, whether the difference in geographic coordinates is less than a preset distance, etc. The content of the first condition is not limited here.

An electronic device usually does not play the audio signal collected by itself. Therefore, if the audio signal obtained by the first electronic device is only the audio signal collected by itself, the first electronic device does not output the audio signal. For the audio processing for this scenario, reference can be made to the audio processing process described in the embodiments above, which is not repeated herewith.

In summary, in a scenario where a plurality of electronic devices are engaged in a multi-party call, an electronic device participating in the multi-party call is recorded as a first electronic device. After the first electronic device receives at least one audio signal sent by another electronic device participating in the multi-party call, instead of outputting directly, a preset attribute value of each of the at least one audio signal is obtained, and a target attribute value of the audio signal collected by the first electronic device itself is determined. The preset attribute value and the target attribute value are configured based on an attribute configuration rule. The attribute configuration rule is determined based on a positional relationship between the plurality of electronic devices participating in the multi-party call, a difference between different preset attribute values can indicate the positional relationship between the corresponding electronic devices. Therefore, in one embodiment, the preset attribute value of the at least one audio signal received is compared with the target attribute value. If a first audio signal whose comparison result satisfies a first condition is detected, a user of the first electronic device can directly hear the first audio signal spoken by the user of another electronic device that sends the first audio signal, and does not require the first electronic device to output the first audio signal. Therefore, in this scenario, the first electronic device is prohibited from outputting the first audio signal, which avoids directly outputting the first audio signal sent by another electronic device to interfere with the user of the first electronic device, and improves the quality and efficiency of the multi-party call.

Figure 3:
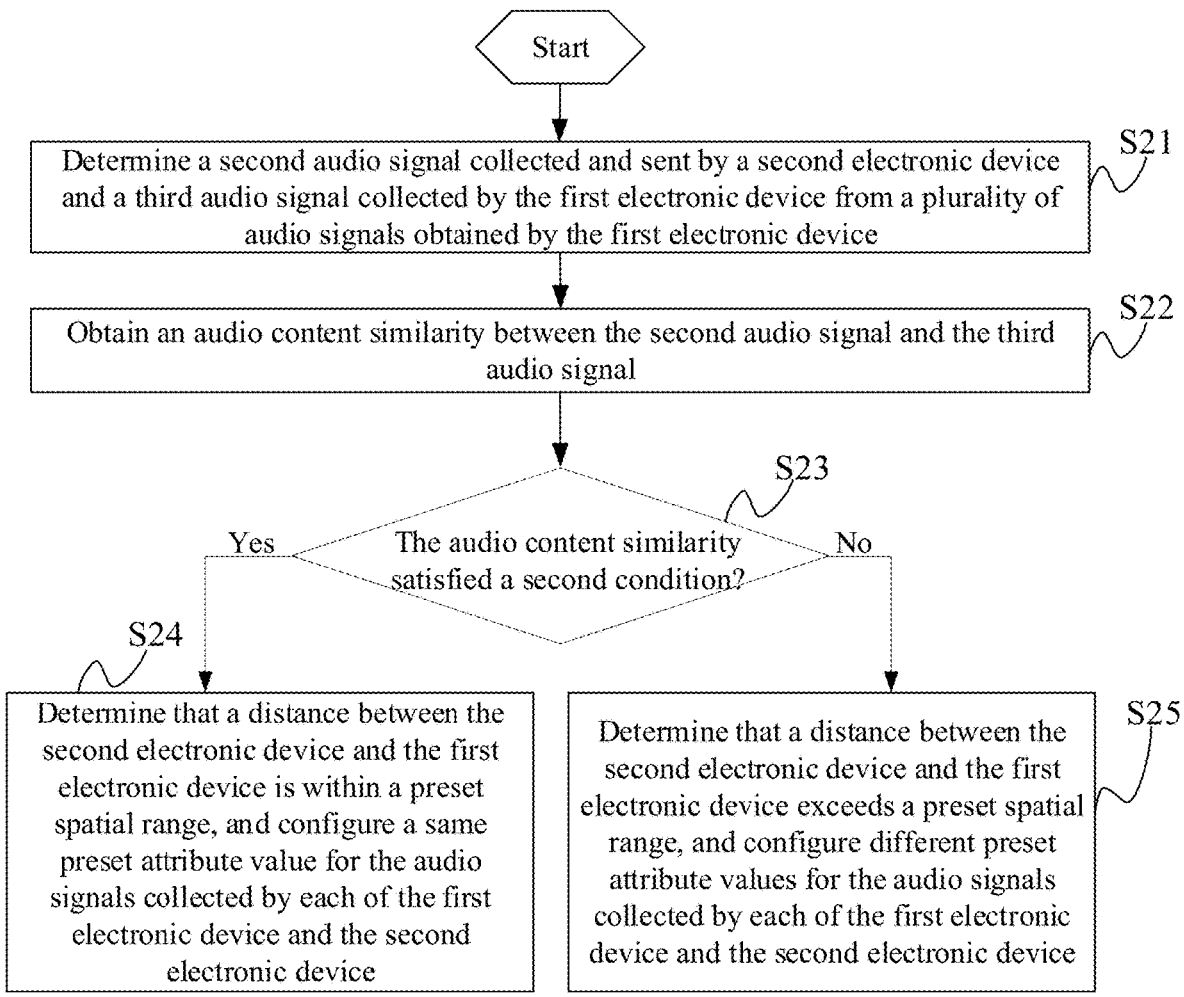
FIG. 3 is a schematic flow chart of an audio processing method for multi-party call according to another example embodiment consistent with the disclosure.

FIG. 3 is a schematic flow chart of an audio processing method for multi-party call according to another example embodiment consistent with the disclosure, which is a detailed implementation method of the above-described audio processing method for multi-party call. The detailed implementation method specifically refines the above-described process of configuring the preset attribute value for the audio signal collected by each of the plurality of electronic devices participating in a multi-party call based on the attribute configuration rule. The detailed implementation method is not limited here. The detailed implementation method can be implemented by an audio processing device for a multi-party call, such as the above-described first electronic device or a communication server, etc. The device type of the audio processing device is not limited here.

As shown in FIG. 3, configuring a preset attribute value for an audio signal collected by each of a plurality of electronic devices participating in a multi-party call includes following processes.

At S21, a second audio signal collected and sent by a second electronic device is determined, and a third audio signal collected by the first electronic device from a plurality of audio signals currently obtained by the first electronic device participating in the multi-party call.

The first electronic device may be any electronic device participating in the multi-party call. During the multi-party call, the first electronic device may receive an audio signal sent by another electronic device participating in the multi-party call through a communication network, and the audio signal is recorded as the second audio signal. The first electronic device can also perform audio recording of the sound generated in the space where the first electronic device is located, that is, collect the third audio signal.

The second audio signal may include the audio signal output by the user of the second electronic device, may also include the audio signal of another sound source in the space where the second electronic device is located, and may even include the audio signal played by the second electronic device itself. Similarly, the third audio signal may include the audio signal output by the user of the first electronic device, the audio signal of another sound source in the space where the first electronic device is located. Another sound source may include another user, another electronic device, or the first electronic device, etc. The specific content and source of the above-described second audio signal and third audio signal are not limited here, which can be determined according to specific application scenarios.

In the practical application of the embodiments, after the electronic device collects the audio signal in the space where the electronic device is located, a device identifier of the electronic device can be added to the electronic device to determine a source device of the audio signal through the device identifier. The content of the device identifier is not limited here. The second audio signal collected and sent by the second electronic device and the third audio signal collected by the first electronic device itself can be identified from a plurality of audio signals currently obtained by the first electronic device according to the device identifier carried by each of the plurality of audio signals.

In some embodiments, because of different sources of the audio signals, the communication channels through which the first electronic device obtains the audio signals are usually different. Therefore, the second audio signal collected and sent from the second electronic device and the third audio signal sent from own audio collector of the first electronic device can be directly determined from a plurality of audio signals currently obtained by the first electronic device according to the source communication channel type of each of the plurality of audio signals.

The specific implementation method of process S21 is not limited here, which is not limited to the two implementation methods listed above. And in practical applications, no matter which way the first electronic device obtains the audio signal, the first electronic device usually stores the obtained audio signal in a data buffer space and then played. Therefore, the plurality of audio signals currently obtained by the first electronic device may not be all obtained at a current moment, may be the audio signal obtained at the current moment and several adjacent moments.

At S22, an audio content similarity between the second audio signal and the third audio signal is obtained.

In practical applications, the method consistent with the present disclosure may be complemented by appropriate artificial intelligence technology, such as by converting the second audio signal and the third audio signal into corresponding text information, and then using natural language processing (NLP) technology to perform content similarity detection on text information. The description of specific similarity detection process is not repeated herewith.

The audio content similarity detection between the second audio signal and the third audio signal may be implemented based on audio characteristics of the audio signal itself. The method to obtain the audio content similarity between different audio signals is not limited here.

If the second audio signal includes a plurality of audio signals from different second electronic devices, and the third audio signal may also include a plurality of frames of audio signals, then the content similarity between each second audio signal and each third audio signal needs to be obtained. The method to obtain the audio content similarity detection is similar as the above-described method, which is not repeated herewith.

At S23, whether the audio content similarity satisfies a second condition is determined. If the second condition is satisfied, go to process S24. If the second condition is not satisfied, go to process S25.

In combination with the effect of configuring attribute configuration rules and preset attribute values in the audio processing method, the positional relationship between corresponding electronic devices is expected to be identified through the preset attribute values. Based on reverse thinking, a corresponding preset attribute value can be configured for the audio signals obtained by each of the electronic devices by determining the positional relationship between different electronic devices participating in a multi-party call.

In practical applications, if different electronic devices participating in a multi-party call are in a same physical space, no matter a user (that is, a participant of the multi-party call) of which electronic device speaks, each of the electronic devices in the physical space may collect and store the corresponding audio signal in a buffer space, and send the collected audio signal to another electronic device participating in the multi-party call. Thus, the electronic device may receive the audio signal of the same content sent by another electronic device. If different electronic devices participating in a multi-party call are in different physical spaces, the audio signal generated by speaking of each participant is only collected by the electronic device of the participant who speaks and sent to another electronic device. Thus, the electronic device may not receive the audio signal of the same content through the communication network.

Therefore, content similarity detection is performed on the audio signal collected by the electronic device itself and the audio signal sent from another electronic device to determine whether the audio content contained in the audio signals obtained by the two methods is consistent with each other, that is, whether the audio content similarity is less than a similarity threshold (a specific value of the similarity threshold is not limited here), to determine whether the electronic device and the another electronic device are in a same physical space.

The second condition may include that the audio content similarity between the second audio signal and the third audio signal obtained by the first electronic device is less than a similarity threshold. In this scenario, it can be determined that the first electronic device and the second audio signal which sending the second audio signal are in a same physical space. Conversely, it can be determined that the first electronic device and the second electronic device are in different physical spaces.

The implementation method to determine whether the first electronic device and the second electronic device are in a same physical space is not limited to the audio content similarity detection method described in the embodiments. Geographic coordinates (which is a way of representing call location information but is not limited here) of each electronic device can be detected, and the difference of geographic coordinates can be directly compared to determine whether the first electronic device and the second electronic device are in a same physical space. The geographic coordinates can be detected by the global positioning system or reported by the user of the electronic device. The method of obtaining call location information and the detection method to determine whether the first electronic device and the second electronic device are in a same physical space are not limited here.

At S24, it is determined that a distance between the second electronic device and the first electronic device is within a preset spatial range, and a same preset attribute value is configured for the audio signals collected by the first electronic device and the second electronic device.

At S25, it is determined that a distance between the second electronic device and the first electronic device exceeds a preset spatial range, and different preset attribute values are configured for the audio signals collected by the first electronic device and the second electronic device.

Whether the different electronic devices are in a same physical space may be indicated by whether a distance between the different electronic devices is within a preset spatial range, but is not limited here, which can be determined based on the requirements of specific application scenarios.

If it is determined that the second electronic device and the first electronic device are in a same physical space by the audio content similarity detecting, it indicates that a physical distance between the second electronic device and the first electronic device is within the preset spatial range. In this scenario, when the two participants speak using the two electronic devices, to prevent both electronic devices from performing audio collection and transmission to interfere with the two participants and reduce the efficiency and quality of multi-party call, a same preset attribute value is configured for the audio signal collected by each of the first electronic device and the second electronic device. Thus, according to the audio processing method described in the above embodiments, after the first electronic device receives the audio signal sent by the second electronic device, it may be detected that the comparison result of the preset attribute values of the two electronic devices satisfies the first condition, and the first electronic device may be prohibited from outputting the audio signal sent by the second electronic device.

In the application scenario shown in FIG. 2B, the electronic device 1 and the electronic device 2 are in a same physical space. A same preset attribute value is configured for the audio signals collected by each of the first electronic device and the second electronic device. That is, no matter the audio signals are the audio signal of participant A and/or the audio signal of participant B collected by the electronic device 1, or the audio signal of participant A and/or the audio signal of participant B collected by the second electronic device, the same preset attribute value is configure for the audio signals. Thus, in an actual multi-party call, the electronic device 1 and the electronic device 2 may no longer output the audio signals of participant A and participant B, which avoids interference to each other and reduces the data processing amount of the corresponding electronic device.

If it is determined that the second electronic device and the first electronic device are not in the same physical space, it indicates that the physical distance between the second electronic device and the first electronic device is not within the preset space range. In this scenario, different preset attribute values are configured for the audio signal collected by each of the first electronic device and the second electronic device. Thus, according to the audio processing method described in the above embodiments, after the first electronic device receives the audio signal sent by the second electronic device, it may be detected that the comparison result of the preset attribute values of the two electronic devices does not satisfy the first condition, the first electronic device may normally output the audio signal sent by the electronic device 2, to avoid missing the speaking content of other participants.

Taking the application scenario shown in FIG. 2B as an example, the electronic device 1 and the electronic device 3 are not in a same physical space, which are expected to receive and output the audio signals sent from each other to enable participant A and participant C to hear the audio signal of each other. Therefore, different preset attribute values are configured for the audio signal collected by the electronic device 1 and the audio signal collected by the electronic device 3. Similarly, different preset attribute values are configured for the audio signal collected by the electronic device 2 and the audio signal collected by the electronic device 3 to ensure the electronic device 3 to receive and output the audio signals sent by the electronic device 1 and the electronic device 2. Thus, participant C in a different physical space can output the audio signal through the electronic device 3 to hear what participant A and participant B speak.

the method to configure the preset attribute value for the audio signal collected by the electronic device is not limited here and can be determined based on the content of the preset attribute value described above, which is not repeated herewith.

In addition, after the corresponding preset attribute value is configured for the audio signal collected by each of the electronic devices participating in a multi-party call according to the above-described method, the corresponding relationship between the preset attribute value and the audio signal collected by the corresponding electronic device can be determined and saved. Thus, during the entire multi-party call, the audio signal collected by the electronic device itself can be configured with a predetermined preset attribute value according to the corresponding relationship to ensure call quality and efficiency of the entire multi-party call.

During the entire multi-party call, the preset attribute value configured for the audio signal collected by each electronic device does not need to be adjusted after the configuration is completed. If adjustment is needed, the preset attribute value described can be reconfigured for the audio signal collected by each electronic device according to the configuration rule consistent with the above-described embodiments.

In summary, in this embodiment, the audio content similarity detection can be performed on the audio signal collected by an electronic device itself participating in a multi-party call and the audio signal sent by another electronic device received through the communication network, to determine whether the distance between the electronic device and the another electronic device is within a preset space range, that is, to detect whether the electronic device and the another electronic device are in the same physical space. Furthermore, a same preset attribute value is configured for the audio signal collected by each of a plurality of electronic devices in a same physical space, and different preset attribute values are configured for the audio signal collected by each of a plurality of electronic devices in different physical spaces. Thus, during the multi-party call, after the electronic device obtain the audio signal, it can be determined whether the source device of the audio signal and the electronic device are in the same physical space by detecting whether the preset attribute values of the audio signal obtained is the same as the preset attribute value of the audio signal collected by the electronic device itself, further to determine whether to output the audio signal to avoid sound confusion caused by the output of audio signals sent from the same electronic device.

In practical applications, as described in the corresponding part of the above embodiments, the process of configuring the preset attribute value consistent with the embodiments can be executed by a communication server. In this scenario, after the communication server receives the audio signal collected and sent by the electronic devices participating in the multi-party call, the preset attribute value of the audio signal collected by each electronic device is determined according to the method described in the above embodiments, and the corresponding relationship between different preset attribute values and the audio signal collected by different electronic devices is generated. Thus, during an actual multi-party call, if an audio signal sent by an electronic device is received, the audio signal can be configured with a corresponding preset attribute value according to the corresponding relationship, and then be sent to another electronic device.

The communication server can also send the determined preset attribute value of the audio signal collected by each electronic device to the corresponding electronic device. Therefore, in an actual multi-party call, after an audio signal is collected by an electronic device participating in a multi-party call in the scenario, the preset attribute value can be configured for the audio signal (e.g., adding the preset attribute value to the data packet generated by the audio signal), and then the audio signal can be sent to the communication server and forwarded by the communication server to another electronic device, to enable the another electronic device to directly obtain the audio signal with the preset attribute value and continue the operation according to the above-described audio processing method.

In some embodiments, after the communication server determines the preset attribute value of the audio signal collected by each electronic device, the communication server may also send the preset attribute value to each electronic device participating in a multi-party call to cause each electronic device to obtain the corresponding relationship between the different preset attribute values and the audio signals collected by different electronic devices. Thus, after an electronic device obtains the audio signal sent by another electronic device, the corresponding relationship can be used to implement the audio processing method consistent with the above embodiments of the present disclosure, which is not repeated herewith.

In some embodiments, if the configuration process of the preset attribute value described in the foregoing embodiments is implemented by an electronic device participating in a multi-party call, such as the foregoing first electronic device, then after the preset attribute value corresponding to the audio signal collected by each electronic device is determined according to the process described in the foregoing embodiments, the first electronic device can send the preset attribute value to the corresponding another electronic device to enable the another electronic device to add the corresponding preset attribute value before the another electronic device sends the collected audio signal, to enable each electronic device participating in a multi-party call to directly obtain the corresponding preset attribute value when each electronic device obtains an audio signal, thereby implementing the audio processing method of the disclosure.

In some embodiments, the first electronic device may also directly obtain different preset attribute values obtained by each electronic device, save the corresponding relationship between the different preset attribute values and the audio signals collected by the different electronic devices, and send the corresponding relationship to another electronic device for saving. Therefore, after an electronic device participating in a multi-party call obtains the audio signal sent by another electronic device, the corresponding relationship can be directly used to obtain the preset attribute value corresponding to the audio signal, thereby implementing the audio processing method.

The execution subject and implementation process of the configuration of the preset attribute value are not limited here. After it is determined that each electronic device participating in a multi-party call obtains the corresponding relationship between the different preset attribute values and the audio signals collected by different electronic devices, how to use the corresponding relationship to implement the specific implementation of the audio processing method consistent with the present disclosure is not limited to the methods described in the above embodiments and can be determined according to the requirements of actual application scenarios.

In some embodiments, to configure the preset attribute values for the audio signals collected by a plurality of electronic devices participating in a multi-party call based on the attribute configuration rules, state information of each of the plurality of electronic devices in the multi-party call can be obtained. The state information may include call location information of the corresponding electronic device, to configure a same preset attribute value for at least two electronic devices located within a preset spatial range according to the call location information. For the specific implementation process and the application process after the configuration is completed, reference may be made to the description of the corresponding part of the foregoing embodiments, which is not repeated herewith.

The call location information may be collected by a collector, or reported by the user of the electronic device, etc., which is not limited here.

On the basis of the implementation method of configuring preset attribute values for the audio signals collected by a plurality of electronic devices participating in a multi-party call based on the attribute configuration rules described in the foregoing embodiments, the configuration of preset attribute values may also be implemented by combining call requirements of the participants in the current call scenario. In a possible implementation, whether there is a call prohibition requirement configured for the first participant and the second participant is detected. The first participant may refer to a participant who uses a first electronic device to participate the multi-party call, and the second participant may refer to a participant who uses a second electronic device to participate the multi-party call. That is, whether the first participant and the second participant are prohibited to speak and hear the voices of each other in the current call scenario. If there is the call prohibition request, the same preset attribute value can be configured for the audio signals collected by the first electronic device and the second electronic device in response to the call prohibition request.

It is determined that the first electronic device and the second electronic device are not in the same physical space through the above-described detection method, that is, it is determined that the distance between the second electronic device and the first electronic device is not within the preset spatial range. It is also possible to further detect whether there is a call prohibition request for the participants of the two electronic devices according to the method described in the embodiments. If there is a call prohibition request, a same preset attribute value is still configured for the audio signals collected by the two electronic devices. If there is no call prohibition request, different preset attribute values may be configured for the audio signals collected by the first electronic device and the second electronic device in the manner described in the foregoing embodiments.

The call prohibition request can be generated in response to a request of the first electronic device, the second electronic device, or another audio processing device. The generation method of the call prohibition request and the content contained therein are not limited here. The content contained in the call prohibition request may generally include identifiers of a plurality of participants who are forbidden to call, such as the device identifier of the corresponding electronic device used, the communication account used for multi-party calls, etc.

For example, in a certain network conference scenario, due to some personal privacy issues, it is not convenient for participant A and participant C to hear the voices of each other. A same preset attribute value can be configured for the received audio signal collected by the corresponding electronic devices of participant A and participant C. Therefore, in combination with the audio processing method described in the above embodiments, the electronic device of participant A may not output the audio signal sent by the electronic device of participant C. Similarly, the electronic device of participant C may not output the audio signal sent by the electronic device of participant A.

Based on the description of the foregoing embodiments, a plurality of preset attribute values may be configured for the audio signals collected by the same electronic device to meet the requirements of different application scenarios. In this scenario, when the preset attribute values corresponding to the audio signals collected by different electronic devices are compared, each of the plurality of preset attribute values corresponding to each of the different electronic devices can be compared to determine whether to output the audio signal sent by another electronic device.

Figure 4:
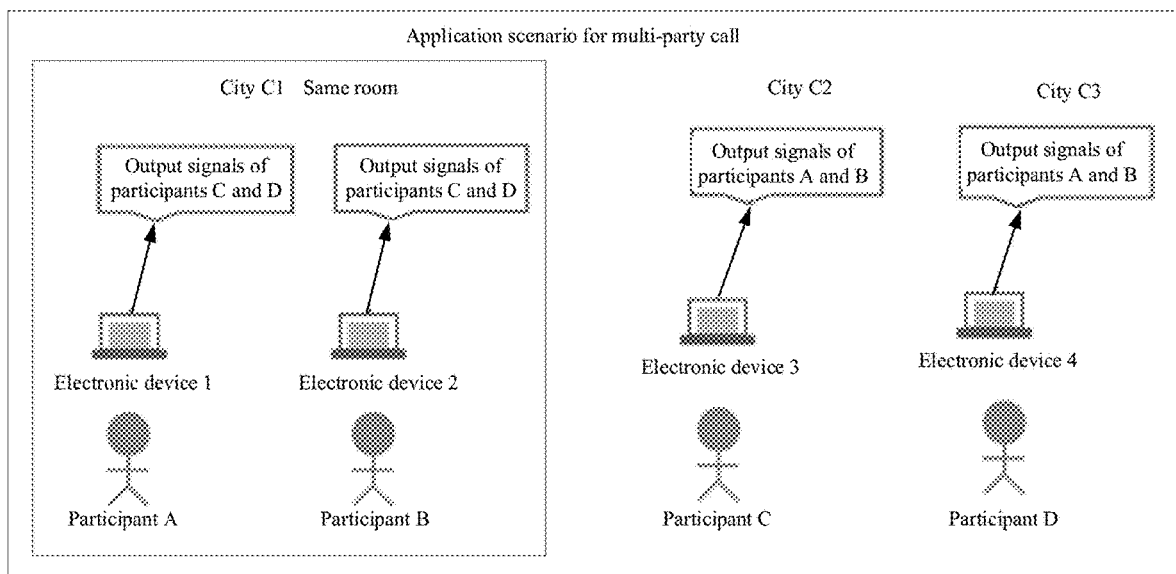
FIG. 4 is a schematic diagram of another application scenario of an audio processing method for multi-party calls consistent with the disclosure.

In the application scenario shown in FIG. 4, participant A and participant B are in the same room (that is, a representation of the same physical space). According to the above attribute configuration rules, a same preset attribute value T1 is configured for an audio signal collected by each of an electronic device 1 and an electronic device 2. Participant C and participant D are not in the same room with each other, and are not in the same room with participant A and participant B. According to the above attribute configuration rules, a preset attribute value T2 can be configured for the audio signal collected by an electronic device 3, and a preset value T3 can be configured for the audio signal collected by an electronic device 4. The preset attribute values T1, T2, and T3 are different from each other, to realize the mutual audio processing of the electronic device 1, the electronic device 2, the electronic device 3, and the electronic device 4 by comparing the preset attribute values T1, T2, and T3. The specific implementation process is not repeated herewith.

However, if during the multi-party call, due to some factors, it is required that participant C and the participant D cannot hear the voices of each other. According to the above attribute configuration rules, a same preset attribute value T4 is required to be configured for the audio signal collected by each of the electronic device 3 and the electronic device 4, which is different from the preset attribute value T1 configured for the audio signals collected by electronic device 1 and the electronic device 2. Therefore, both the electronic device 3 and the electronic device 4 may only output the audio signals of participant A and participant B, but not output the audio signal of each other (that is, the participant D or participant C), which meets the call requirements of the current multi-party call.

The implemented configuration process of the preset attribute values of the audio signals collected by each electronic device in response to the requirements for prohibiting calls between participants in the above application scenarios is similar as the configuration process described in the above embodiments, which is not repeated herewith.

If there is a participant who is in the same physical space as one of the participants who are prohibited from speaking, a same preset attribute value can be directly configured for the audio signals collected by the electronic devices used by the three participants. In the application scenario shown in FIG. 4, participant A and participant C are prohibited from hearing the voices of each other. A same preset attribute value can be configured for the audio signals collected by the electronic devices used by participant A, participant B, and participant C to prevent the electronic device 2 of participant B from outputting the audio signal of participant C to cause participant A in the same room as participant B to hear the speaking content of participant C, which cannot meet the requirement to prohibit participant A and participant C from hearing the voices of each other.

Figure 5:
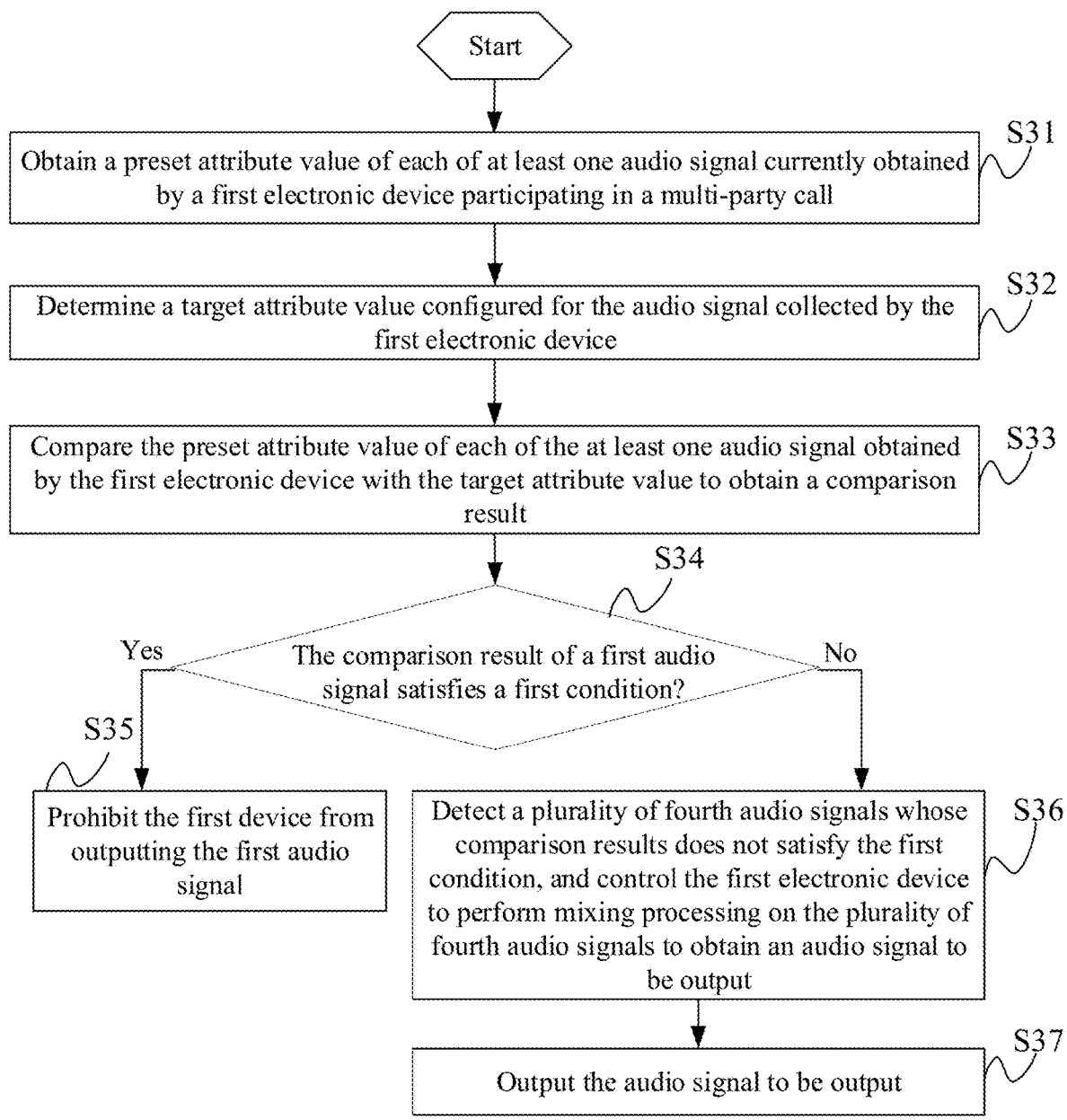
FIG. 5 is a schematic flow chart of an audio processing method for multi-party call according to another embodiment consistent with the disclosure.

FIG. 5 is a schematic flow chart of an audio processing method for multi-party call according to another example embodiment consistent with the disclosure.

As shown in FIG. 5, at S31, a preset attribute value of each of at least one audio signal currently obtained by a first electronic device participating in a multi-party call is obtained.

The preset attribute value may be configured for the audio signal collected by each of a plurality of electronic devices participating in the multi-party call based on an attribute configuration rule, and the attribute configuration rule may be determined based on a positional relationship between the plurality of electronic devices. For the implementation process, reference may be made to the description of the corresponding part of the foregoing embodiments, which is not repeated herewith.

With reference to the description of the foregoing embodiments, process S31 may specifically include obtaining the preset attribute value of each of the at least one audio signal collected by the first electronic device, and/or receiving a fifth audio signal collected and sent by a second electronic device and obtaining the preset attribute value of the fifth audio signal. That is, the at least one audio signal currently obtained by the first electronic device may include the audio signal collected by the first electronic device itself, and/or the audio signal collected by another electronic device received through the communication network.

At S32, a target attribute value configured for the audio signal collected by the first electronic device is determined.

At S33, the obtained preset attribute value of each of the at least one audio signal is compared with the target attribute value to obtain a corresponding comparison result.

At S34, whether there is a first audio signal whose comparison result satisfies a first condition is detected. If there is a first audio signal, go to process S35. If there is no first audio signal, go to process S36.

At S35, the first electronic device is prohibited from outputting the first audio signal whose comparison result satisfies the first condition.

For the specific implementation process of process S31 to process S35, reference may be made to the description of the corresponding part of the foregoing embodiments, which is not repeated herewith.

At S36, a plurality of fourth audio signals whose comparison result does not satisfy the first condition are detected, and the first electronic device is controlled to perform mixing processing on the plurality of fourth audio signals to obtain audio signal to be output.

At S37, the audio signal to be output is output.

In this embodiment, it is determined that there is an audio signal from another electronic device in a different physical space from the plurality of audio signals obtained by the first electronic device according to the above method. In the application scenario shown in FIG. 2B, the electronic device 3 receives the audio signals of each of the electronic device 1 and the electronic device 2. According to the above detection method, it can be determined that the comparison result between the preset attribute value of the audio signal of each of the electronic device 1 and the electronic device 2 and the target attribute value of the audio signal collected by electronic device 3 itself does not satisfy the first condition. The electronic device 3 needs to output the audio signals sent by the electronic device 1 and the electronic device 2. If the receiving time of the two audio signals crosses, rather than receiving an audio signal after a certain period of time when another audio signal is received, it usually needs to perform mixing processing on the plurality of audio signals, and then output the obtained mixed audio as the audio to be output.

The implementation method of how to mix a plurality of audio signals into one audio signal output is not limited here. For example, the mixing can be implemented by using software or hardware circuits. The mixing can be implemented according to actual application requirements, which is not specified here.

In summary, whether the comparison result between the preset attribute value of the audio signal from another electronic device received by the first electronic device in a multi-party call and the target attribute value corresponding to the first electronic device itself satisfies the first condition is detected. Therefore, the first electronic device determines to prohibit outputting the audio signals sent by another electronic device corresponding to the comparison result that satisfies the first condition, and output the audio signals sent by another electronic device corresponding to the comparison result that does not satisfy the first condition, to avoid the sound confusion caused by a plurality of electronic devices in the same physical space playing the audio signal from each other, thereby improving the quality and efficiency of multi-party call.

Figure 6:
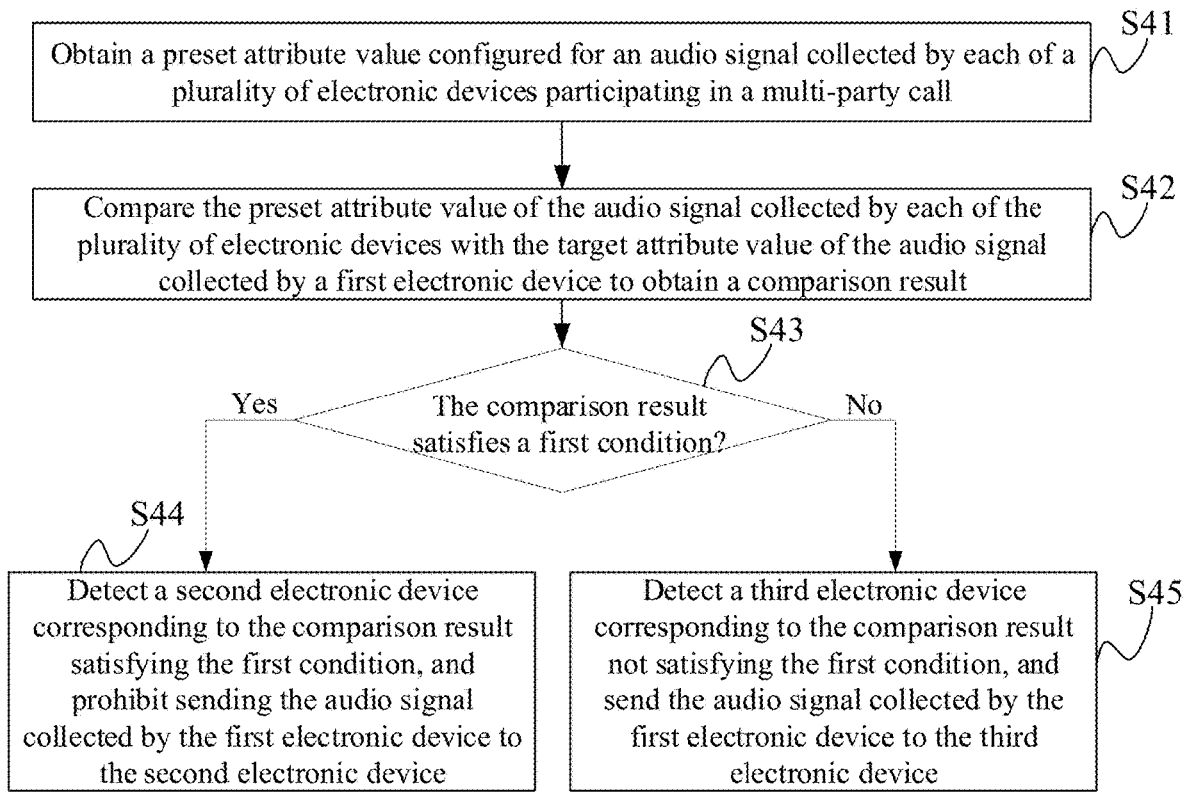
FIG. 6 is a schematic flow chart of an audio processing method for multi-party call according to another embodiment consistent with the disclosure.

FIG. 6 is a schematic flow chart of an audio processing method for multi-party call according to another example embodiment consistent with the disclosure.

As shown in FIG. 6, at S41, a preset attribute value configured for an audio signal collected by each of a plurality of electronic devices participating in a multi-party call is obtained.

At S42, the preset attribute value of the audio signal collected by each of the plurality of electronic devices is compared with the target attribute value of the audio signal collected by a first electronic device to obtain a comparison result.

At S43, whether the comparison result satisfies a first condition is detected. If the comparison result satisfies the first condition, go to process S44. If the comparison result does not satisfy, go to process S45.

For the implementation of process S41 to process S43, reference may be made to the description of the corresponding part of the foregoing embodiments, which is not repeated herewith.

At S44, a second electronic device corresponding to the comparison result satisfying the first condition is detected, and the audio signal collected by the first electronic device is prohibited from being sent to the second electronic device.

At S45, a third electronic device corresponding to the comparison result not satisfying the first condition is detected, and the audio signal collected by the first electronic device is sent to the third electronic device.

This embodiment is described from a perspective view of whether to send the audio signal collected by the first electronic device to another electronic device, which can be implemented by a communication server or the first electronic device, which is not limited here.

According to the above comparison and detection method of the preset attribute value, it is determined that the second electronic device and the first electronic device are in the same physical space. The audio signal collected by the first electronic device can be directly prohibited from being sent to the second electronic device, which avoids the interference caused by the second electronic device outputting the audio signal collected by the first electronic device, and enables the second electronic device to reduce the analysis of the audio signal collected by the first electronic device when the second electronic device determines the audio signal to be output, thereby reducing the data processing workload of the second electronic device.

Similarly, it is determined that the third electronic device and the first electronic device are in the different physical spaces. The audio signal collected by the first electronic device may be continually sent to the third electronic device. In this process, the detection result can also be sent to the third electronic device. Therefore, after the third electronic device receives the audio signal collected and sent by the first electronic device, the third electronic device can directly output the audio signal without performing the audio processing method described above, thereby reducing data analysis and processing workload of the third electronic device and improving the efficiency of the multi-party call.

Figure 7:
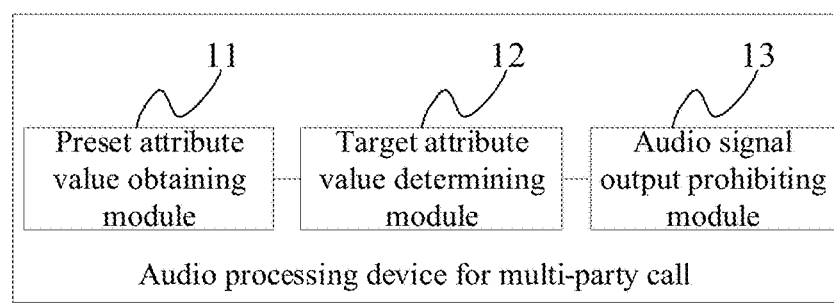
FIG. 7 is a schematic structural diagram of an audio processing device for multi-party call according to an embodiment consistent with the disclosure.

FIG. 7 is a schematic structural diagram of an audio processing device for multi-party call according to one embodiment consistent with the disclosure. As shown in FIG. 7, the audio processing device includes a preset attribute value obtaining module 11, a target attribute value determining module 12, and an audio signal output prohibiting module 13.

The preset attribute value obtaining module 11 is used to obtain a preset attribute value of each of at least one audio signal currently obtained by the first electronic device participating in a multi-party call.

The preset attribute value is configured for the audio signal collected by each of a plurality of electronic devices participating in the multi-party call according to an attribute configuration rule, and the attribute configuration rule is determined according to a positional relationship between the plurality of electronic devices.

In a possible implementation manner, the preset attribute value obtaining module 11 may include a first attribute value obtaining unit and/or a second attribute value obtaining unit.

The first attribute value obtaining unit is used to obtain the preset attribute value of each of the at least one audio signal collected by the first electronic device.

The second attribute value obtaining unit is used to receive a fifth audio signal collected and sent by a second electronic device, and obtain the preset attribute value of the fifth audio signal.

The target attribute value determining module 12 is used to determine a target attribute value configured for the audio signal collected by the first electronic device.

The audio signal output prohibition module 13 is used to detect whether there is a first audio signal whose comparison result between the corresponding preset attribute value and the target attribute value satisfies a first condition from the at least one audio signal obtained by the first electronic device, and prohibit the first electronic device from outputting the first audio signal.

Figure 8:
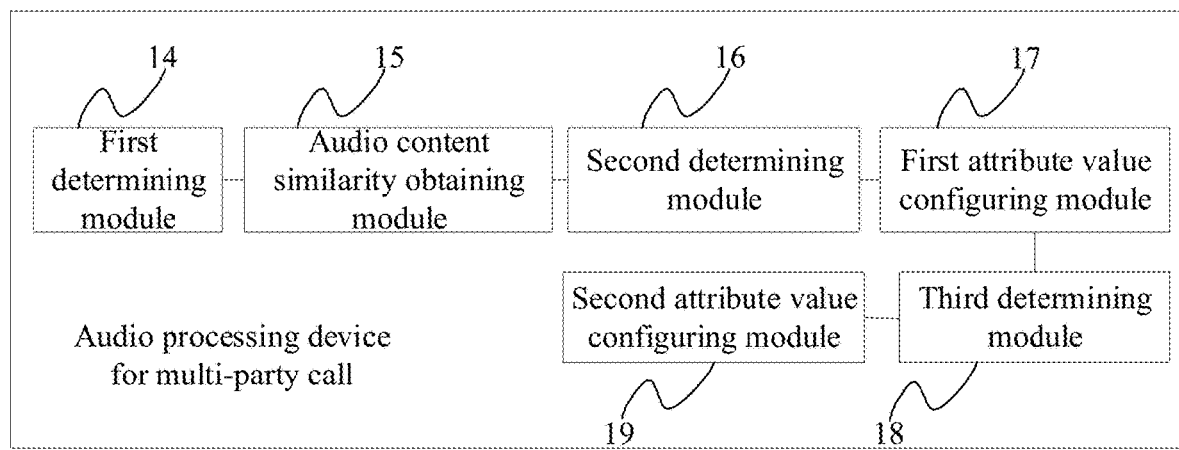
FIG. 8 is a schematic structural diagram of an audio processing device for multi-party call according to another embodiment consistent with the disclosure.

FIG. 8 is a schematic structural diagram of an audio processing device for multi-party call according to another example embodiment consistent with the disclosure. As shown in FIG. 8, to realize the configuration of the preset attribute value for the audio signal collected by each of the plurality of electronic devices participating in the multi-party call, the audio processing device further includes a first determining module 14, an audio content similarity obtaining module 15, a second determining module 16, a first attribute value configuring module 17, a third determining module 18, and a second attribute value configuring module 19.

The first determining module 14 is used to detect a second audio signal collected and sent by the second electronic device and a third audio signal collected by the first electronic device from the plurality of audio signals obtained by the first electronic device.

The audio content similarity obtaining module 15 is used to obtain an audio content similarity between the second audio signal and the third audio signal.

The second determining module 16 is used to determine that a distance between the second electronic device and the first electronic device is within a preset spatial range when the audio content similarity satisfies a second condition.

The first attribute value configuring module 17 is used to configure a same preset attribute value for the audio signal collected by each of the first electronic device and the second electronic device.

The third determining module 18 is used to determine that the distance between the second electronic device and the first electronic device exceeds the preset spatial range when the audio content similarity does not satisfy the second condition.

The second attribute value configuring module 19 is used to configure different preset attribute values for the audio signals collected by the first electronic device and the second electronic device.

In some embodiments, to implement the configuration of the preset attribute values for the audio signals collected by the plurality of electronic devices participating in the multi-party call, the audio processing device may further include a state information obtaining module and a third attribute value configuring module.

The state information obtaining module is used to obtain state information of each of the plurality of electronic devices participating in the multi-party call, where the state information includes call location information of the corresponding electronic device.

The third attribute value configuring module is used to configure a same preset attribute value for at least two electronic devices located within the preset spatial range according to the call location information.

In some embodiments, to implement the configuration of the preset attribute values for the audio signals collected by the plurality of electronic devices participating in the multi-party call, the audio processing device may further include a call request detecting module and a fourth attribute value configuring module.

The call request detecting module is used to detect whether there is a call prohibition request configured for a first participant and a second participant. The first participant refers to a participant who uses the first electronic device to participate the multiparty call. The second participant refers to a participant who uses the second electronic device to participate the multi-party call.

The fourth attribute value configuring module is used configure a same preset attribute value for each of the audio signals collected by the first electronic device and the second electronic device in response to the call prohibition request.

In some embodiments, on the basis of the audio processing device described in the foregoing embodiments, the audio processing device may further include and audio detecting module and an audio output module.

The audio detecting module is used to detect that there is a fourth audio signal whose comparison result between the corresponding preset attribute value and the target attribute value does not satisfy the first condition from the at least one audio signal.

The audio output module is used to control the first electronic device to output the fourth audio signal.

If there are a plurality of fourth audio signals, the audio output module may include an audio mixing processing unit and an audio output unit.

The audio mixing processing unit is used to control the first electronic device to perform mixing processing on the plurality of fourth audio signals to obtain an audio signal to be output.

The audio output unit is used to output the audio signal to be output.

In some embodiments, on the basis of the audio processing device described in the foregoing embodiments, the audio processing device may further include an attribute value obtaining module, an attribute value comparison module, an audio sending prohibiting module, and an audio sending module.

The attribute value obtaining module is used to obtain the preset attribute value configured for the audio signal collected by each of the plurality of electronic devices participating in the multi-party call.

The attribute value comparing module is used to compare the preset attribute value of the audio signal collected by each of the plurality of electronic devices with the target attribute value of the audio signal collected by the first electronic device to obtain a comparison result.

The audio sending prohibiting module is used to detect that there is a second electronic device corresponding to the comparison result that satisfies the first condition, and prohibit the audio signal collected by the first electronic device from being sent to the second electronic device.

The audio sending module is used to detect that there is a third electronic device corresponding to the comparison result that does not satisfy the first condition and send the audio signal collected by the first electronic device to the third electronic device.

Various modules and units in the device consistent with the above-described embodiments can all be stored in the memory as program modules. The processor can execute the program modules stored in the memory to realize the corresponding functions. For the functions implemented and technical effects achieved by each program module and combinations, reference may be made to the description of the corresponding part of the method consistent with the embodiments, which are not repeated herewith.

A storage medium storing a computer program is provided in the disclosure. The computer program can be called and loaded by a processor to implement each process of the audio processing method for multi-party call described in the foregoing embodiments.

Figure 9:
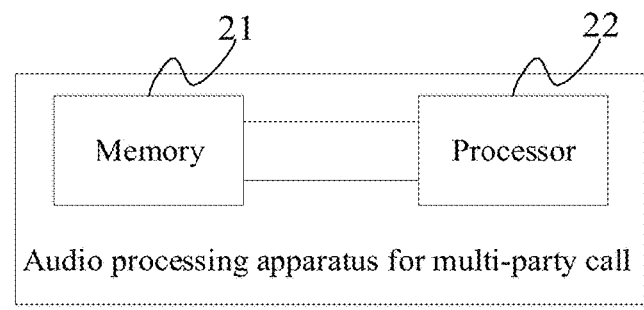
FIG. 9 is a schematic hardware structural diagram of an audio processing apparatus of multi-party call according to an embodiment consistent with the disclosure.

FIG. 9 is a schematic hardware structural diagram of an audio processing apparatus of multi-party call according to one embodiment consistent with the disclosure. The audio processing apparatus may be a service apparatus used to implement inter-communication between a plurality of electronic devices participating in a multi-party call, or any electronic apparatus participates in a multi-party call that has a voice call function. The apparatus type of the audio processing apparatus is not limited here.

In some embodiments, the above-described service apparatus may be a communication server, such as an independent physical server, or a server cluster composed of a plurality of physical servers, or a cloud server supporting cloud computing. The above electronic apparatus may include, but are not limited to, a smart phone, a tablet computer, a wearable device, an ultra-mobile personal computer (UMPC), a netbook, a personal digital assistant (PDA), an e-book reader, or a desktop, etc. The audio processing apparatus shown in FIG. 9 is only an example and should not limit the function and scope of use of the embodiments of the present application.

As shown in FIG. 9, the audio processing apparatus includes at least one memory 21 and at least one processor 22.

The memory 21 may be used to store a program for implementing the audio processing method applied to a multi-party call as described above; the processor 22 may be used to load and execute the program stored in the memory 21 to implement the application to a multi-party call described in any of the above method embodiments For each step of the audio processing method, the specific implementation process can refer to the description of the corresponding part of the foregoing embodiment, which may not be repeated in this embodiment.

In an embodiment, the memory 21 may include a high-speed random-access memory, and may also include a non-volatile memory, such as at least one magnetic disk storage device or another volatile solid-state storage device. The processor 22 may be a central processing unit (CPU), an application-specific integrated circuit (ASIC), a digital signal processor (DSP), an application specific integrated circuit (ASIC), a ready-made programmable gate array (FPGA), or another programmable logic device, etc.

The structure of the audio processing apparatus shown in FIG. 9 does not constitute a limitation on the audio processing apparatus consistent with the embodiments of the present disclosure. In practical applications, the audio processing apparatus may include more or fewer members than the audio processing apparatus shown in FIG. 9. If the audio processing apparatus is an electronic apparatus participating in a multi-party call, the audio processing apparatus may also include an audio collector and an audio player, or even another input device, output device, etc., which are not listed here.

Various embodiments in this specification are described in a progressive or parallel manner. Each embodiment focuses on the differences from other embodiments. For the same and similar parts between the various embodiments, reference can be made to each other. For the audio processing device and audio processing apparatus consistent of the present disclosure, reference can be made to the description of the audio processing method.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. An audio processing method for a multi-party call, comprising:
   obtaining a preset attribute value of each of at least one audio signal currently obtained by a first electronic device participating in a multi-party call, wherein the preset attribute value is configured to accommodate the audio signal collected by each of a plurality of electronic devices participating in the multi-party call according to an attribute configuration rule determined according to a positional relationship between the plurality of electronic devices;
   determining a target attribute value configured for the audio signal collected by the first electronic device; and
   detecting a first audio signal from the at least one audio signal obtained by the first electronic device and prohibiting the first electronic device from outputting the first audio signal, wherein a comparison result between a corresponding preset attribute value of the first audio signal and the target attribute value satisfies a first condition.

2. The audio processing method of claim 1, wherein configuring the preset attribute value for the audio signal collected by each of the plurality of electronic devices participating in the multi-party call according to the attribute configuration rule includes:
   determining a second audio signal collected and sent by a second electronic device and a third audio signal collected by the first electronic device from a plurality of audio signals obtained by the first electronic device;
   obtaining an audio content similarity between the second audio signal and the third audio signal; and
   in response to the audio content similarity satisfying a second condition, determining that a distance between the second electronic device and the first electronic device is within a preset spatial range, and configuring a same preset attribute value for the audio signals collected by each of the first electronic device and the second electronic device; or
   in response to the audio content similarity not satisfying the second condition, determining that a distance between the second electronic device and the first electronic device exceeds a preset spatial range, and configuring different preset attribute values for the audio signals collected by each of the first electronic device and the second electronic device.

3. The audio processing method of claim 1, wherein configuring the preset attribute value for the audio signal collected by each of the plurality of electronic devices participating in the multi-party call according to the attribute configuration rule includes:
   obtaining state information including call location information of each of the plurality of electronic devices participating in the multi-party call; and
   configuring a same preset attribute value for at least two electronic devices located within a preset spatial range according to the call location information.

4. The audio processing method of claim 1, wherein configuring the preset attribute value for the audio signal collected by each of the plurality of electronic devices participating in the multi-party call according to the attribute configuration rule includes:
  detecting whether a call prohibition request is configured for a first participant using the first electronic device to participate the multi-party call and a second participant using the second electronic device to participate the multi-party call; and
  in response to the call prohibition request, configuring a same preset attribute value for each of the audio signals collected by the first electronic device and the second electronic device.

5. The audio processing method of claim 1, further comprising:
  detecting a fourth audio signal from the at least one audio signal obtained by the first electronic device and controlling the first electronic device to output the fourth audio signal, wherein a comparison result between a corresponding preset attribute value of the fourth audio signal and the target attribute value does not satisfy the first condition;
  in response to a plurality of fourth audio signals, controlling the first electronic device to output the fourth audio signals includes:
    controlling the first electronic device to perform mixing processing on the plurality of fourth audio signals to obtain an audio signal to be output; and
    outputting the audio signal to be output.

6. The audio processing method of claim 1, wherein obtaining the preset attribute value of each of the at least one audio signal currently obtained by a first electronic device participating in the multi-party call includes:
  obtaining the preset attribute value of each of the at least one audio signal collected by the first electronic device; and
  receiving a fifth audio signal collected and sent by the second electronic device and obtaining the preset attribute value of the fifth audio signal.

7. The audio processing method of claim 1, further comprising:
  obtaining the preset attribute value configured for the audio signal collected by each of the plurality of electronic devices participating in the multi-party call;
  comparing the preset attribute value of the audio signal collected by each of the plurality of electronic devices with the target attribute value of the audio signal collected by the first electronic device to obtain the comparison result;
  detecting a second electronic device corresponding to the comparison result satisfying the first condition, and prohibiting sending the audio signal collected by the first electronic device to the second electronic device; and
  detecting a third electronic device corresponding to the comparison result not satisfying the first condition, and sending the audio signal collected by the first electronic device to the third electronic device.

8. An audio processing device for a multi-party call, comprising:
  a preset attribute value obtaining module configured to obtain a preset attribute value of each of at least one audio signal currently obtained by a first electronic device participating in a multi-party call, wherein the preset attribute value is configured to accommodate the audio signal collected by each of a plurality of electronic devices participating in the multi-party call according to an attribute configuration rule determined according to a positional relationship between the plurality of electronic devices;
  a target attribute value determining module configured to determine a target attribute value configured for the audio signal collected by the first electronic device; and
  an audio signal output prohibiting module configured to detect a first audio signal from the at least one audio signal currently obtained by the first electronic device and prohibit the first electronic device from outputting the first audio signal, wherein a comparison result between a corresponding preset attribute value of the first audio signal and the target attribute value satisfies a condition.

9. An audio processing apparatus for a multi-party call, comprising:
  a memory storing a computer program; and
  a processor configured to execute the computer program to:
    obtain a preset attribute value of each of at least one audio signal currently obtained by a first electronic device participating in a multi-party call, wherein the preset attribute value is configured to accommodate the audio signal collected by each of a plurality of electronic devices participating in the multi-party call according to an attribute configuration rule determined according to a positional relationship between the plurality of electronic devices;
    determine a target attribute value configured for the audio signal collected by the first electronic device; and
    detect a first audio signal from the at least one audio signal currently obtained by a first electronic device and prohibit the first electronic device from outputting the first audio signal, wherein a comparison result between a corresponding preset attribute value of the first audio signal and the target attribute value satisfies a first condition.

10. The audio processing apparatus of claim 9, wherein the processor is further configured to execute the computer program to:
  determine a second audio signal collected and sent by a second electronic device and a third audio signal collected by the first electronic device from a plurality of audio signals obtained by the first electronic device;
  obtain an audio content similarity between the second audio signal and the third audio signal; and
  in response to the audio content similarity satisfying a second condition, determine that a distance between the second electronic device and the first electronic device is within a preset spatial range, and configure a same preset attribute value for the audio signals collected by each of the first electronic device and the second electronic device; or
  in response to the audio content similarity not satisfying the second condition, determine that the distance between the second electronic device and the first electronic device exceeds the preset spatial range, and configure different preset attribute values for the audio signals collected by each of the first electronic device and the second electronic device.

11. The audio processing apparatus of claim 9, wherein the processor is further configured to execute the computer program to:

obtain state information including call location information of each of the plurality of electronic devices participating in the multi-party call; and configure a same preset attribute value for at least two electronic devices located within a preset spatial range according to the call location information.

12. The audio processing apparatus of claim 9, wherein the processor is further configured to execute the computer program to:

detect whether a call prohibition request is configured for a first participant using the first electronic device to participate the multi-party call and a second participant using the second electronic device to participate the multi-party call; and in response to the call prohibition request, configure a same preset attribute value for each of the audio signals collected by the first electronic device and the second electronic device.

13. The audio processing apparatus of claim 9, wherein the processor is further configured to execute the computer program to:

detect a fourth audio signal from the at least one audio signal obtained by the first electronic device and control the first electronic device to output the fourth audio signal, wherein a comparison result between a corresponding preset attribute value of the fourth audio signal and the target attribute value does not satisfy the first condition; and in response to a plurality of fourth audio signals, control the first electronic device to perform mixing processing on the plurality of fourth audio signals to obtain an audio signal to be output, and output the audio signal to be output.

14. The audio processing apparatus of claim 9, wherein the processor is further configured to execute the computer program to:

obtain the preset attribute value of each of the at least one audio signal collected by the first electronic device; and receive a fifth audio signal collected and sent by the second electronic device and obtaining the preset attribute value of the fifth audio signal.

15. The audio processing apparatus of claim 9, wherein the processor is further configured to execute the computer program to:

obtain the preset attribute value configured for the audio signal collected by each of the plurality of electronic devices participating in the multi-party call;

compare the preset attribute value of the audio signal collected by each of the plurality of electronic devices with the target attribute value of the audio signal collected by the first electronic device to obtain the comparison result;

detect a second electronic device corresponding to the comparison result satisfying the first condition, and prohibit sending the audio signal collected by the first electronic device to the second electronic device; and detect a third electronic device corresponding to the comparison result not satisfying the first condition, and send the audio signal collected by the first electronic device to the third electronic device.

16. The apparatus of claim 9, further comprising:

an electronic apparatus participating in the multi-party call, or a service apparatus configured to implement communication between a plurality of electronic apparatus participating in the multi-party call; and an audio collector and an audio player in response to the audio processing apparatus being the electronic apparatus participating in the multi-party call.

* * * * *